United States Patent
Jeon et al.

(10) Patent No.: US 9,552,759 B2
(45) Date of Patent: Jan. 24, 2017

(54) DISPLAY WITH GATE LINES IN A DIAGONAL DIRECTION

(71) Applicant: Samsung Display Co., Ltd., Yongin, Gyeonggi-Do (KR)

(72) Inventors: Sang-Jin Jeon, Suwon-si (KR); Il-Gon Kim, Seoul (KR); Hee-Rim Song, Seoul (KR)

(73) Assignee: Samsung Display Co., Ltd., Giheung-Gu, Yongin-si, Gyonggi-Do (KR)

( * ) Notice: Subject to any disclaimer, the term of this patent is extended or adjusted under 35 U.S.C. 154(b) by 40 days.

(21) Appl. No.: 14/731,704

(22) Filed: Jun. 5, 2015

(65) Prior Publication Data

US 2016/0005351 A1 Jan. 7, 2016

(30) Foreign Application Priority Data

Jul. 4, 2014 (KR) .................. 10-2014-0083981

(51) Int. Cl.
*G06F 3/038* (2013.01)
*G09G 3/20* (2006.01)

(52) U.S. Cl.
CPC ............. *G09G 3/2085* (2013.01); *G09G 3/20* (2013.01); *G09G 2300/026* (2013.01); *G09G 2300/043* (2013.01); *G09G 2300/0408* (2013.01); *G09G 2300/0413* (2013.01); *G09G 2300/0426* (2013.01); *G09G 2310/0202* (2013.01);
(Continued)

(58) Field of Classification Search
USPC ....................................................... 345/204
See application file for complete search history.

(56) References Cited

U.S. PATENT DOCUMENTS 8,552,958 B2 10/2013 Park et al.
2007/0018918 A1 1/2007 Chung
(Continued)

FOREIGN PATENT DOCUMENTS

CN 203519983 4/2014
KR 10-2010-0048103 A 5/2010
(Continued)

OTHER PUBLICATIONS

European Search Report issued by European Patent Office on Nov. 23, 2015 in connection with European Patent Application No. 15161053.2, which also claims Korean Patent Application Serial No. 10-2014-0083981 as its priority document.

*Primary Examiner* — Gustavo Polo
(74) *Attorney, Agent, or Firm* — Robert E. Bushnell, Esq.

(57) ABSTRACT

A display apparatus includes a display panel including a driving part arranged along one side of the display panel, the display panel including a plurality of first gate lines that zigzag across the display in a diagonal direction between the first and second directions by alternately extending in the first and the second directions. The display device includes a first display area and a second display area, pixels within the first display area always receiving gate signals from a driving part connected to an end of the first gate lines. Within the second display area, a second gate lines extending in the first direction may be electrically connected to the first gate lines that relay gate signals to the first gate lines. This results in a reduced peripheral area of the display area, so that many displays can be combined together to produce a single image.

20 Claims, 9 Drawing Sheets

(52) U.S. Cl.
CPC ......... *G09G 2310/0278* (2013.01); *G09G 2310/0281* (2013.01); *G09G 2310/08* (2013.01); *G09G 2320/0247* (2013.01)

(56) References Cited

U.S. PATENT DOCUMENTS

| | | |
|---|---|---|
| 2013/0321521 A1 | 12/2013 | Fujie et al. |
| 2014/0043306 A1 | 2/2014 | Min et al. |
| 2015/0340001 A1* | 11/2015 | Jung ............... G02F 1/136286 345/205 |

FOREIGN PATENT DOCUMENTS

| | | |
|---|---|---|
| KR | 10-2011-0067227 A | 6/2011 |
| KR | 10-2015-0101026 A | 9/2015 |
| KR | 10-2015-0107943 A | 9/2015 |

\* cited by examiner

DISPLAY WITH GATE LINES IN A DIAGONAL DIRECTION

CLAIM OF PRIORITY

This application claims priority under 35 U.S.C. §119 to Korean Patent Application No. 10-2014-0083981, filed on Jul. 4, 2014, the disclosure of that is incorporated by reference herein in its entirety.

BACKGROUND OF THE INVENTION

Field of the Invention

Exemplary embodiments of the inventive concept relate to a display apparatus capable of improving display quality.

Description of the Related Art

A flat panel display apparatus such as a liquid crystal display apparatus, an organic light emitting display apparatus and etc may realize high definition and large screen by increasing resolution or display area. For example, a liquid crystal display apparatus may include an array substrate including a plurality of pixel electrodes arranged in a matrix form, an opposite substrate facing the array substrate, and a liquid crystal layer disposed between the array substrate and the opposite substrate. The liquid crystal display apparatus may further include a driving part to apply a predetermined voltage to the pixel electrodes. For example, the driving part may include a circuit part to control an image signal.

SUMMARY OF THE INVENTION

When a plurality of flat panel display apparatuses are disposed adjacent to each other to realize large screen (i.e. multi-screen), one image may be seen as a plurality of images divided by a boundary of the flat display apparatuses. In addition, needs to reduce the boundary have been increased to improve design of the flat display apparatuses.

One or more exemplary embodiment of the inventive concept provides a display apparatus capable of reducing a peripheral area of the display apparatus and capable of improving display quality.

According to one aspect of the present invention, there is provided a display apparatus including a display panel and a driving part to drive the display panel, the display panel including a plurality of pixels arranged in a matrix form along a first direction and a second direction crossing the first direction, a plurality of first gate lines extending across the display in a diagonal direction that is between the first and the second directions by alternately extending in each of the first and the second directions, a first insulation layer arranged on the first gate lines, a plurality of second gate lines arranged on the first insulation layer and extending in the first direction, a plurality of data lines extending parallel to the second gate lines, the driving part being electrically connected to the first and the second gate lines and the data lines and a floating voltage supply line electrically connected to at least one of the second gate lines, wherein a plurality of gate signals are applied to the pixels via the first gate lines, the gate signals being synchronized along the diagonal direction.

The display panel may also include a first display area including a plurality of first pixels electrically connected to a first plurality of the first gate lines, wherein the first plurality of the first gate lines may apply a first gate signal to the first pixels by receiving the first gate signal directly from the driving part and a second display area including a plurality of second pixels electrically connected to a second plurality of the first gate lines, the second plurality of the first gate lines may apply a second gate signal to the second pixels by receiving the second gate signal from the driving part via the second gate lines. Within the first display area, a first end of each of the second gate line may be connected to the driving part, and a second and opposite end of each of the second gate lines may be connected to the floating voltage supply line. A timing of applying the second gate signal may be subsequent to a timing of applying the first gate signal. The floating voltage supply line may apply a floating voltage to the second gate lines arranged within the first display area while the second pixels are being driven. In the second display area, the second plurality of the first gate lines may be respectively electrically connected to the second gate lines. An end portion of each first gate line within the second display area and opposite the driving part may be electrically connected to a corresponding one of the second gate lines.

The driving part may be adjacent to a first side of the display panel. The floating voltage supply line may be adjacent to a second and opposite side of the display panel. The second gate lines and the data lines may be made out of substantially a same material.

The second gate lines and the data lines may be formed from a same layer. The display panel may also include a second insulation layer arranged on the second gate lines and on the data lines, wherein the floating voltage supply line may make contact with the at least one of the second gate lines through a contact hole perforating the second insulation layer.

The floating voltage supply line may be formed from a same layer as the first gate lines. The floating voltage supply line may include an extending portion extending in the second direction and a connecting portion protruding from the extending portion. At least one end of the second gate lines may makes contact with the connecting portion via a contact hole perforating the first insulation layer.

The floating voltage supply line may be formed from a different layer than that of the first gate lines. Each of the pixels may include a plurality of pixel electrodes and a plurality of switching elements that are electrically connected to the pixel electrodes, the switching elements may overlap a portion of the first gate lines at a location corresponding to where the first gate lines extend in the second direction.

According to another aspect of the present invention, there is provided a display apparatus including a display panel and a driving part to drive the display panel, the display panel having a first side extending in a first direction, a second side opposite the first side, and third and fourth sides extending in a second direction and connecting the first side to the second side, the driving part being arranged adjacent to the first side, the display panel may include a diagonal gate line zigzagging in a diagonal direction by alternately extending in the first and the second directions, a dummy gate line extending in the second direction, a data line extending parallel to the dummy gate line and a floating voltage supply line electrically connected to the dummy gate line, wherein the floating voltage supply line applies a floating voltage to the dummy gate line when a gate signal is not being applied to the diagonal gate line. The floating voltage supply line may be adjacent to the second side.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in that like reference symbols indicate the same or similar components, wherein.

DETAILED DESCRIPTION OF THE INVENTION

Hereinafter, the inventive concept will be explained in detail with reference to the accompanying drawings.

Figure 1:
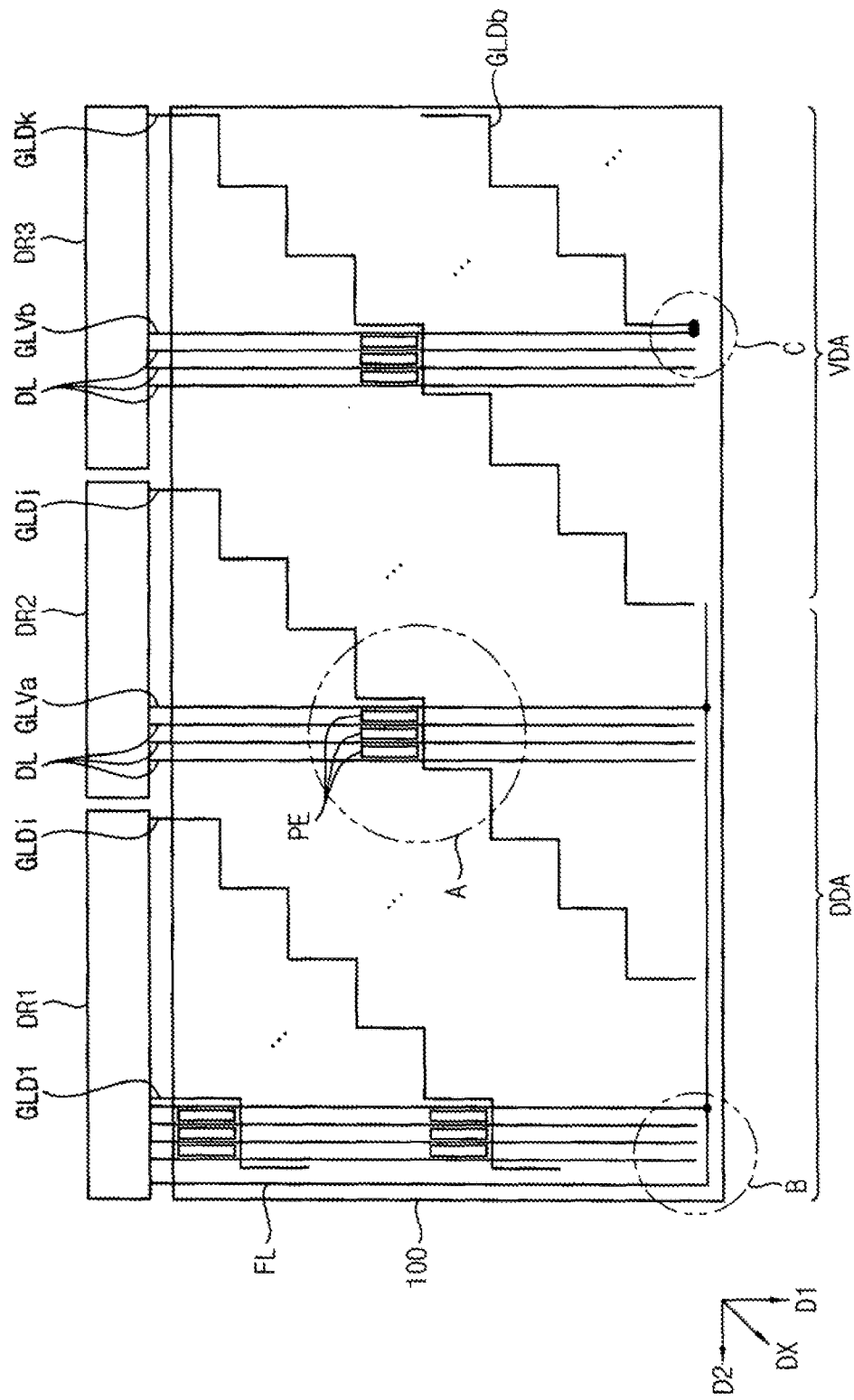
FIG. 1 is a plan view illustrating a display apparatus according to an exemplary embodiment of the present invention.
Figure 2:
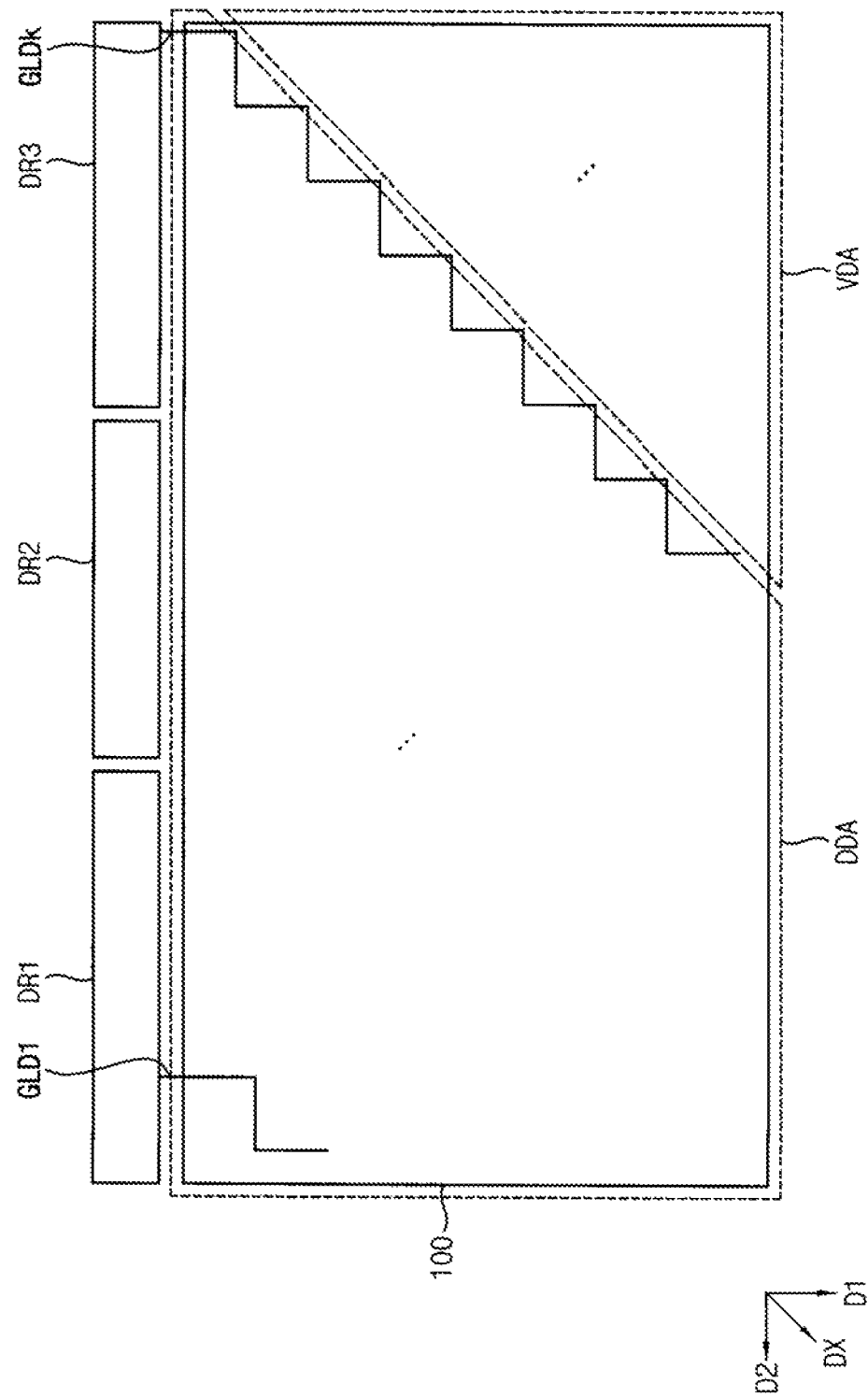
FIG. 2 is a plan view illustrating display areas, that are different from each other, of the display apparatus of FIG. 1.

Turning now to FIGS. 1 and 2, FIG. 1 is a plan view illustrating a display apparatus according to an exemplary embodiment of the present invention and FIG. 2 is a plan view illustrating first and second display areas of a display panel of the display apparatus of FIG. 1. Referring now to FIGS. 1 and 2, the display apparatus according to the present example embodiment may include a display panel 100 and driving parts DR1, DR2 and DR3.

The display panel 100 may include a plurality of pixel electrodes PE, a plurality of diagonal gate lines GLD1, GLDi, GLDj, GLDk and GLDb, a plurality of vertical gate lines GLVa and GLVb, a plurality of data lines DL and a floating voltage supply line FL. The display panel 100 may further include the first display area DDA and the second display area VDA. The pixel electrodes PE may be arranged in a matrix form. For example, one pixel may include three of the pixel electrodes PE.

The driving parts DR1, DR2 and DR3 may be adjacent to one of a side of the display panel 100. For example, the driving parts DR1, DR2 and DR3 may be adjacent to an upper side of the display panel 100. The driving parts DR1, DR2 and DR3 may include a first driving part DR1, a second driving part DR2 adjacent to the first driving part DR1, and a third driving part DR3 adjacent to the second driving part DR2. The driving parts DR1, DR2 and DR3 may include a data driving part and a gate driving part. For example, each of the first driving part DR1, the second driving part DR2 and the third driving part DR3 may include a data driving part and a gate driving part. In addition, the first driving part DR1 may further include a floating voltage supply part that is connected to the floating voltage supply line FL. By consolidating the data driver and the gate driver to a single set of driving parts, and by having these driving parts arranged only on one of four sides of the display panel, a peripheral area of the display apparatus can be reduced, making it more conducive to combine many display panels 100 together to produce a single, large image.

The diagonal gate lines GLD1, GLDi, GLDj, GLDk and GLDb zigzag along a diagonal direction DX across the display by alternately extending in a first direction D1 and in a second direction D2 that is substantially perpendicular to the first direction D1. For example, the diagonal gate lines GLD1, GLDi, GLDj, GLDk and GLDb may have a zig-zag form that alternately extends in the first direction D1 and in the second direction D2. The pixel electrodes PE are disposed at upper and lower sides of the zig-zag form at a location corresponding to where the diagonal gate line is extending in the first direction D1.

The diagonal gate lines GLD1, GLDi, GLDj, GLDk and GLDb may be electrically connected to the driving parts DR1, DR2 and DR3. For example, first diagonal gate line GLD1 to i-th diagonal gate line GLDi may be electrically connected to the first driving part DR1, i+1-th diagonal gate line (not shown) to j-th diagonal gate line GLDj may be connected to the second driving part DR2, and j+1-diagonal gate line (not shown) to k-th diagonal gate line GLDk may be connected to the third driving part DR3.

In the first display area DDA, a first plurality of diagonal gate lines corresponding to the first diagonal gate line GLD1 to the k-th diagonal gate line GLDk may be arranged. In the first display area DDA, the pixels that include the pixel electrodes PE may receive gate signals that have a same timing along a diagonal direction DX that is between the first direction D1 and the second direction D2. For example, a first timing gate signal may be applied to pixels that are connected to the first diagonal gate line GLD1. Likewise, an i-th timing gate signal may be applied to pixels that are connected to the i-th diagonal gate line GLDi, and a j-th timing gate signal may be applied to pixels that are connected to the j-th diagonal gate line GLDj and a k-th timing gate signal may be applied to pixels that are connected to the k-th diagonal gate line GLDk.

Accordingly, in the first display area DDA, the pixels may sequentially receive gate signals from the diagonal gate lines GLD1, GLDi, GLDj and GLDk that are respectively connected to the first driving part DR1, the second driving part DR2 and the third driving part DR3. Therefore, in the first display area DDA, the first plurality of diagonal gate lines supply first gate signals to pixels within the first display area DDA, the first plurality of diagonal gate lines receiving the first gate signals directly from the driving parts DR1, DR2 and DR3.

Referring now to FIG. 2, the first display area DDA may be the one of display areas of the display panel 100 that has an inverted trapezoidal shape. The second display area VDA of the display panel 100 that is adjacent to the first display area DDA may be a display area that has a triangular shape.

Some of the diagonal gate lines GLDb (i.e. the second plurality of diagonal gate lines) may be disposed within the second display area VDA. In the second display area VDA, the diagonal gate lines GLDb may be connected to the vertical gate lines GLVb. For example, an end of the diagonal gate line GLDb along the diagonal direction DX and opposite the driving parts may be connected to the vertical gate line GLVb. Although not shown in the figures, the diagonal gate lines disposed in the second display area VDA may be connected to corresponding vertical gate lines, respectively.

The data lines DL may extend along the first direction D1, while being spaced-apart from each other in the second direction D2. First ends of the data lines DL may be connected to the driving parts DR1, DR2 and DR3. The data lines DL may apply data voltages to the pixel electrodes PE.

The vertical gate lines GLVa and GLVb may extend in parallel with the data lines DL. For example, the vertical gate lines GLVa and GLVb may extend in the first direction D1. Vertical gate lines GLVa can be referred to as a first plurality of vertical gate lines. The first plurality of gate liens GLVa are gate lines that i) are arranged entirely within the first display area DDA, ii) are connected to the floating voltage supply line FL, and iii) are not electrically connected to any of the diagonal gate lines. In contrast, a remaining of the vertical gate lines can be referred to as a second plurality of vertical gate lines GLVb, and are gate lines that i) at least partially arranged within the second display area VDA, ii) are not connected to any floating voltage supply line FL, and iii) are electrically connected to a diagonal gate line GLD. In the present example embodiment, when a pixel includes three pixel electrodes PE, three data lines DL and one vertical gate line GLV may be disposed adjacent to each pixel electrode PE to deliver signals to the pixel electrode PE. The number of the pixel electrodes PE included in the pixel may be varied according to the example embodiments.

The floating voltage supply line FL may extend along and adjacent to a boundary of the display panel 100. For example, in the first display area DDA, the floating voltage supply line FL is connected to the first driving part DR1, is disposed adjacent to the left side of the display panel 100, and extends in the first direction D1. The floating voltage supply line FL may also be disposed adjacent to a lower side of the display panel 100 and extend in an opposite direction of the second direction D2 within the first display area DDA.

The floating voltage supply line FL may be connected to ends of the vertical gate lines GLVa arranged entirely within the first display area DDA. For example, in the first display area DDA, a first end of the vertical gate lines GLVa may be connected to the driving parts DR1 and DR2, and a second end of the vertical gate lines GLVa may be electrically connected to the floating voltage supply line FL.

The floating voltage supply line FL may apply a floating voltage to the vertical gate lines GLVa of the first display area DDA. For example, the floating voltage supply line FL may apply the floating voltage to the vertical gate lines GLVa at a time when second display area VDA is being driven with gate signals.

In the present example embodiment, the first driving part DR1, the second driving part DR2 and the third driving part DR3 may sequentially apply to the first gate signals to the first to k-th diagonal gate lines GLD1 to GLDk corresponding to the first plurality of diagonal gate lines. By doing so, a data voltage may be applied to the pixel electrodes PE disposed within the first display area DDA.

Subsequently, the second driving part DR2 and the third driving part DR3 may sequentially apply second gate signals to the vertical gate lines GLVb that are electrically connected to the second plurality of diagonal gate lines GLDb arranged within the second display area VDA. In the second display area VDA, the second gate signals may be applied to the second plurality of diagonal gate lines GLDb via the vertical gate lines GLVb. By doing so, a data voltage may be applied to the pixel electrodes PE arranged within the second display area VDA.

Accordingly, the first gate signals for driving the pixel electrodes PE within the first display area DDA may be provided along the first plurality of diagonal gate lines GLD1, GLDi, GLDj and GLDk in the diagonal direction DX. The second gate signals for driving the pixel electrodes PE within the second display area VDA may be provided to the second plurality of diagonal gate lines in a direction opposite to the diagonal direction DX. Furthermore, during the driving time of the pixels within the second display area VDA, the floating voltage may be applied to vertical gate lines GLVa that are electrically connected to the floating voltage supply line FL to suppress image flickering.

Accordingly, in a display apparatus according to the present example embodiment, the driving part DR1, DR2 and DR3 are disposed adjacent to a first side of the display panel (for example an upper side of the display panel), so that a boundary area of the display panel may be reduced.

In addition, after display timing of the first display area DDA where gate signals are synchronized with pixels along the diagonal direction DX, during display timing of the second display area VDA where gate signals are synchronized with pixels along an opposite direction to the diagonal direction DX (i.e. −DX), a floating voltage is applied to dummy gate lines GLVa of the first display area DDA so that image flickering that occurs when the dummy gate lines GLVa of the first display area DDA are effected by peripheral electrical signal may be reduced. Thus, display quality may be improved.

Figure 3:
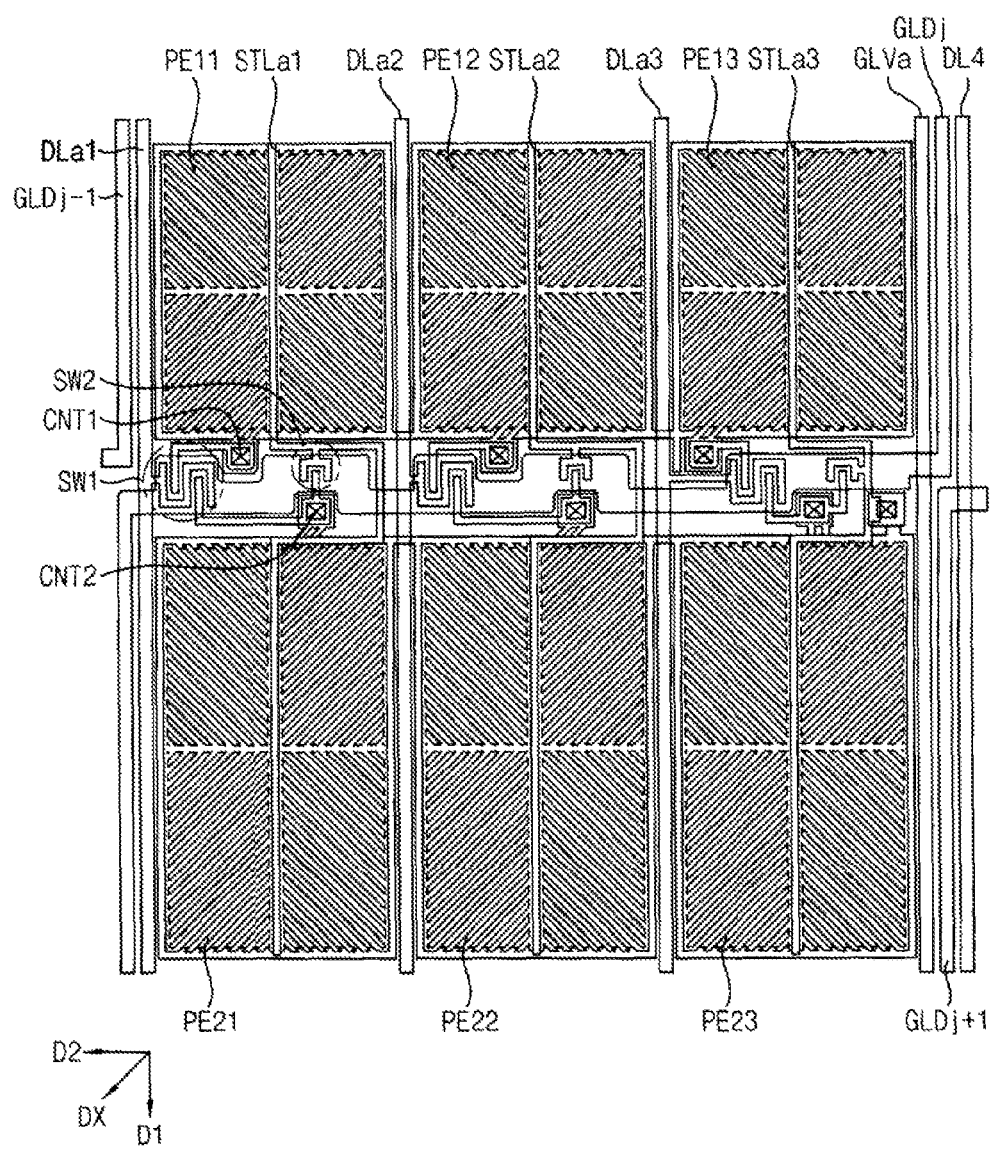
FIG. 3 is an enlarged plan view illustrating A area of FIG. 1.

Hereinafter, a display according to the present example embodiment will be explained in detail with reference to FIGS. 3 to 8. Turning now to FIG. 3, FIG. 3 is an enlarged plan view illustrating area A of FIG. 1. Referring now to FIG. 3, a display panel 100 of a display apparatus according to the present example embodiment may include a plurality of pixel electrodes PE11, PE12, PE13, PE21, PE22 and PE23, switching elements SW1 and SW2 electrically connected to the pixel electrodes, a plurality of data lines DLa1, DLa2 and DLa3, a plurality of vertical gate lines GLVa, a plurality of diagonal gate lines GLDj−1, GLDj and GLDj+1.

For example, one pixel may include three or six of the pixel electrodes PE11, PE12, PE13, PE21, PE22 and PE23. The pixel electrodes may be electrically connected to the switching elements SW1 and SW2 that overlap the diagonal gate line GLDj, respectively.

For example, a first pixel electrode PE11 may be electrically connected to a first switching element SW1 that overlaps the diagonal gate line GLDj via a first contact hole CNT1. The first pixel electrode PE11 may be disposed adjacent to upper side of the diagonal gate line GLDj as the diagonal gate line GLDj extends along the second direction D2. The second pixel electrode PE21 may be electrically connected to a second switching element SW2 that overlaps the diagonal gate line GLDj via a second contact hole CNT2. The second pixel electrode PE21 may be disposed adjacent to lower side of the diagonal gate line GLDj as the diagonal gate line GLDj extends along the second direction D2.

Similarly, each of a third pixel electrode PE12, a fourth pixel electrode PE22, a fifth pixel electrode PE13 and a sixth pixel electrode PE23 may be electrically connected to a switching element that overlaps the diagonal gate line GLDj.

In the present example embodiment, the display panel 100 may further include a first storage line STLa1 crossing the first and second pixel electrodes PE11 and PE21, a second storage line STLa2 crossing the third and fourth pixel electrodes PE12 and PE22, and a third storage line STLa3 crossing the fifth and sixth pixel electrodes PE13 and PE23. The first storage line STLa1, the second storage line STLa2 and the third storage line STLa3 may extend in the first direction D1.

In the present example embodiment, the vertical gate line GLVa may be disposed adjacent to the fifth and sixth pixel electrodes PE13 and PE23. For example, the vertical gate line GLVa may be disposed between the fifth and sixth pixel electrodes PE13 and PE23 and portions of the diagonal gate lines GLDj and GLDj+1 as the diagonal gate lines GLDj and GLDj+1 extend in the first direction D1.

The vertical gate line GLVa may be formed from a same layer as the data lines DLa1, DLa2, DLa3. More specifically, the vertical gate line GLVa may include a material substantially the same as the DLa1, DLa2, DLa3, which may include aluminum Al, gold Au, silver Ag, copper Cu, iron Fe, nickel Ni, alloy thereof, and the like.

In the present example embodiment, switching elements electrically connected to the first to sixth pixel electrodes PE11, PE12, PE13, PE21, PE22 and PE23 may receive a gate signal having a same timing and from the diagonal gate line GLDj. For example, the switching elements may receive a synchronized first gate signal synchronized from the diagonal gate line GLDj.

Although the pixel electrodes PE11, PE12, PE13, PE21, PE22, PE23 have a structure driven by a same gate signal in FIG. 3, the first, third and fifth pixel electrodes PE11, PE12, PE13 may be driven by the diagonal gate line GLDj and the second, fourth and sixth pixel electrodes PE21, PE22, PE23 may instead be driven by an adjacent diagonal gate line GLDj+1 according to another example embodiment.

Figure 4:
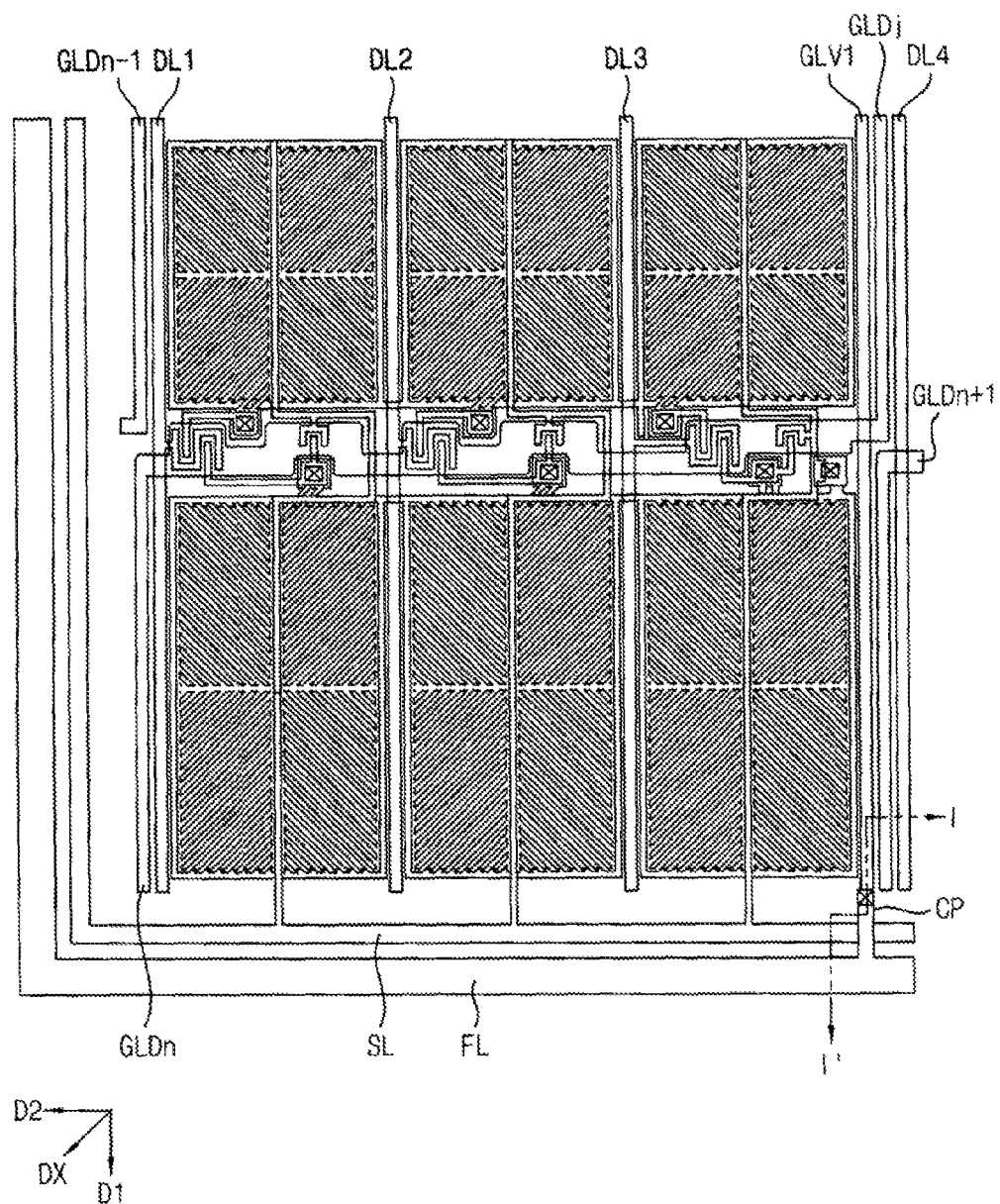
FIG. 4 is an enlarged plan view illustrating B area of FIG. 1.
Figure 5:
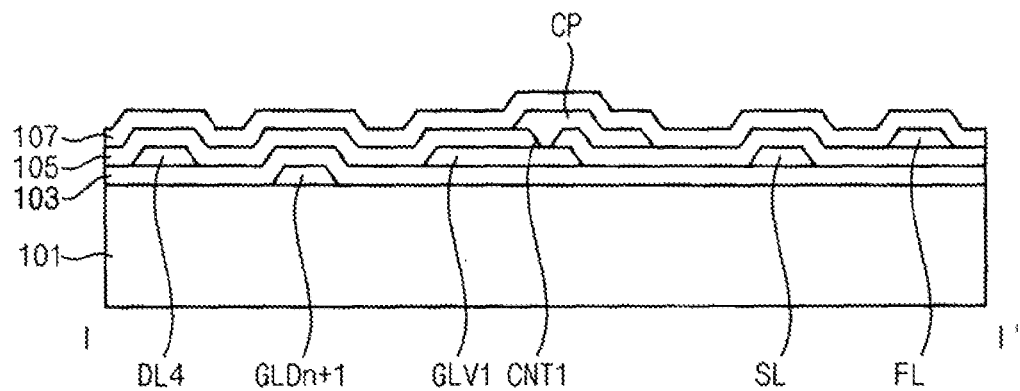
FIG. 5 is a cross-sectional view taken along a line I-I' of FIG. 4.

Turning now to FIGS. 4 and 5, FIG. 4 is an enlarged plan view illustrating area B of FIG. 1, and FIG. 5 is a cross-sectional view taken along a line I-I' of FIG. 4. Referring now to FIGS. 4 and 5, a display panel 100 of a display apparatus according to the present example embodiment may include a base substrate 101, a plurality of diagonal gate lines GLDn−1, GLDn and GLDn+1, a gate insulation layer 103, a plurality of data lines DL1, DL2, DL3 and DL4, a plurality of vertical gate lines GLV1, a storage voltage supply line SL, a data insulation layer 105, a floating voltage supply line FL and a passivation layer 107. A structure having the vertical gate lines GLV1 electrically connected to the floating voltage supply line FL in a first display area DDA is described in FIGS. 4 and 5.

The base substrate 101 may include a transparent insulating material. For example, the base substrate 101 may include glass, quartz, and/or plastic. For example, the base substrate 101 may include polyethylene terephthalate resin, polyethylene resin, polycarbonate resin and the like. The base substrate 101 may be a flexible substrate.

The diagonal gate lines GLDn−1, GLDn and GLDn+1 may be arranged on the base substrate 101. The diagonal gate lines GLDn−1, GLDn and GLDn+1 may zigzag diagonally in the DX direction across the display by alternately extending in a first direction D1 and in a second direction D2 that is substantially perpendicular to the first direction D1. In addition, the diagonal gate lines GLDn−1, GLDn and GLDn+1 may include aluminum Al, gold Au, silver Ag, copper Cu, iron Fe, nickel Ni, alloy thereof, and the like. Alternately, the diagonal gate lines GLDn−1, GLDn and GLDn+1 may include metal oxide such as indium doped zinc oxide (IZO), doped zinc oxide (GZO) and etc.

The gate insulation layer 103 may be arranged on the base substrate 101 and on the diagonal gate lines GLDn−1, GLDn and GLDn+1. The gate insulation layer 103 may overall cover the diagonal gate lines GLDn−1, GLDn and GLDn+1. In the present invention, the gate insulation layer 103 may include inorganic insulation layer and/or organic insulation layer. For example, the gate insulation layer 103 may include silicon oxide, silicon nitride and etc.

The data lines DL1, DL2, DL3 and DL4 may be disposed on the gate insulation layer 103. The data lines DL1, DL2, DL3 and DL4 extend in the first direction D1 and may be spaced apart from each other in the second direction D2. The data lines DL1, DL2, DL3 and DL4 may include a material substantially the same as that of the diagonal gate lines GLDn−1, GLDn and GLDn+1. Alternatively, the data lines DL1, DL2, DL3 and DL4 may include a material different from that of the diagonal gate lines GLDn−1, GLDn and GLDn+1.

The vertical gate lines GLV1 may be formed from a same layer as the data lines DL1, DL2, DL3 and DL4. More specifically, the vertical gate lines GLV1 and the data lines DL1, DL2, DL3 and DL4 may be produced by forming a metal layer (not shown) on the gate insulation layer 103 and then patterning the metal layer. The vertical gate lines GLV1 may include a material substantially same as that of the data lines DL1, DL2, DL3 and DL4.

The storage voltage supply line SL may be adjacent to the floating voltage supply line FL. The storage voltage supply line SL may be electrically connected to the storage lines. In the present example embodiment, the storage voltage supply line SL may be formed from a same layer as the vertical gate lines GLV1 and the data lines DL1, DL2, DL3 and DL4.

The data insulation layer 105 may be formed on the base substrate 101 and on the data lines DL1, DL2, DL3 and DL4. The data insulation layer 105 may include inorganic insulation layer and/or organic insulation layer.

The floating voltage supply line FL may be arranged on the base substrate 101 and on the data insulation layer 105. The floating voltage supply line FL may be disposed adjacent to a boundary of the display panel 100. For example, the floating voltage supply line FL may be disposed adjacent to a lower side of the display panel 100. The floating voltage supply line FL may extend in a direction opposite to the second direction D2.

The floating voltage supply line FL may include an extending portion extending in the direction opposite to the second direction D2, and a connecting portion CP protruding from the extending portion. The connecting portion CP may be electrically connected to the vertical gate line GLV1. For example, the connecting portion CP may make contact with the vertical gate line GLV1 through a third contact hole CNT3 that perforates the data insulation layer 105. The passivation layer 107 may then be arranged on the base substrate 101 and on the floating voltage supply line FL.

Figure 6:
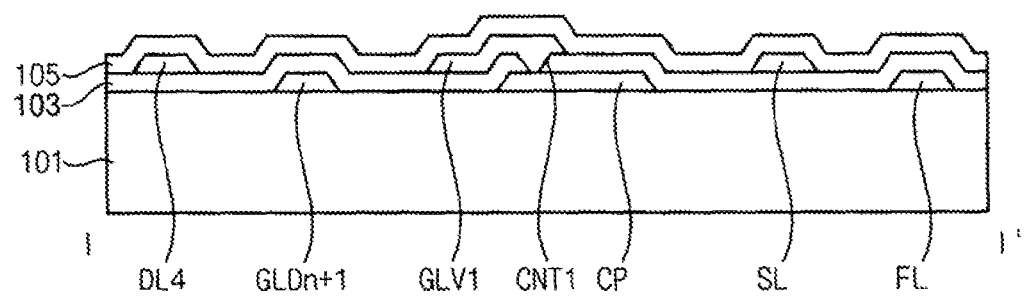
FIG. 6 is an alternative cross-sectional view taken along I-I' of FIG. 4 according to another embodiment of the present invention.

Turning now to FIG. 6, FIG. 6 is an alternative cross-section of FIG. 4 taken along I-I' according to another embodiment of the resent invention than that of FIG. 5. Referring now to FIG. 6, a display panel 100 of a display apparatus according to the present example embodiment may include a base substrate 101, a floating voltage supply line FL, a plurality of diagonal gate lines GLDn−1, GLDn and GLDn+1, a gate insulation layer 103, a plurality of data lines DL1, DL2, DL3 and DL4, a plurality of vertical gate lines GLV1, a storage voltage supply line SL, and a data insulation layer 105. A structure having the vertical gate lines GLV1 electrically connected to the floating voltage supply line FL in a first display area DDA is described in FIG. 6. In addition, the floating voltage supply line FL may be formed from a same layer as the diagonal gate lines GLDn−1, GLDn and GLDn+1.

The base substrate 101 may include a transparent insulating material. For example, the base substrate 101 may include glass, quartz, and/or plastic. For example, the base substrate 101 may include polyethylene terephthalate resin, polyethylene resin, polycarbonate resin and the like. The base substrate 101 may also be a flexible substrate.

The diagonal gate lines GLDn−1, GLDn and GLDn+1 may be arranged on the base substrate 101. The diagonal gate lines GLDn−1, GLDn and GLDn+1 may zigzag diagonally along direction DX across the display by alternately extending in a first direction D1 and in a second direction D2 that is substantially perpendicular to the first direction D1.

The floating voltage supply line FL may be disposed on the base substrate 101. The floating voltage supply line FL may be formed from a same layer as that of the diagonal gate lines GLDn−1, GLDn and GLDn+1. For example, the diagonal gate lines GLDn−1, GLDn and GLDn+1 and the floating voltage supply line FL may be produced by forming a metal layer (not shown) on the base substrate 101 and then patterning the metal layer.

The floating voltage supply line FL may be disposed adjacent to a boundary of the display panel 100. For example, the floating voltage supply line FL may be disposed adjacent to a lower side of the display panel 100, and may extend in a direction opposite to the second direction D2. More specifically, the floating voltage supply line FL may include an extending portion extending in the direction opposite to the second direction D2, and a connecting portion CP protruded from the extending portion.

The gate insulation layer 103 may be arranged on the base substrate 101, on the diagonal gate lines GLDn−1, GLDn and GLDn+1 and on the floating voltage supply line FL. The gate insulation layer 103 may overall cover the diagonal gate lines GLDn−1, GLDn and GLDn+1 and the floating voltage supply line FL. In addition, the gate insulation layer 103 may include silicon oxide, silicon nitride and etc.

The data lines DL1, DL2, DL3 and DL4 may be arranged on the gate insulation layer 103. The data lines DL1, DL2, DL3 and DL4 extend in the first direction D1 and are spaced apart from each other in the second direction D2. The data lines DL1, DL2, DL3 and DL4 may include a material substantially the same as that of the diagonal gate lines GLDn−1, GLDn and GLDn+1. Alternatively, the data lines DL1, DL2, DL3 and DL4 may include a material different from that of the diagonal gate lines GLDn−1, GLDn and GLDn+1.

The vertical gate lines GLV1 may be formed from a same layer as the data lines DL1, DL2, DL3 and DL4. For example, the vertical gate lines GLV1 and the data lines DL1, DL2, DL3 and DL4 may be produced by forming a metal layer (not shown) on the gate insulation layer 103 and then patterning the metal layer. The vertical gate lines GLV1 may include a material substantially the same as that of the data lines DL1, DL2, DL3 and DL4.

In the present example embodiment, the vertical gate lines GLV1 may be electrically connected to the floating voltage supply line FL. For example, the vertical gate lines GLV1 may make contact with the connecting portion CP of the floating voltage supply line FL through a third contact hole CNT3 that perforates the gate insulation layer 103.

The storage voltage supply line SL may be adjacent to the floating voltage supply line FL. The storage voltage supply line SL may be electrically connected to the storage lines. In the present example embodiment, the storage voltage supply line SL may be formed from a same layer as that of the vertical gate lines GLV1 and the data lines DL1, DL2, DL3 and DL4.

The data insulation layer 105 may be formed on the base substrate 101, on the data lines DL1, DL2, DL3 and DL4 and the vertical gate lines GLV1. The data insulation layer 105 may include an inorganic insulation layer and/or organic insulation layer.

Figure 7:
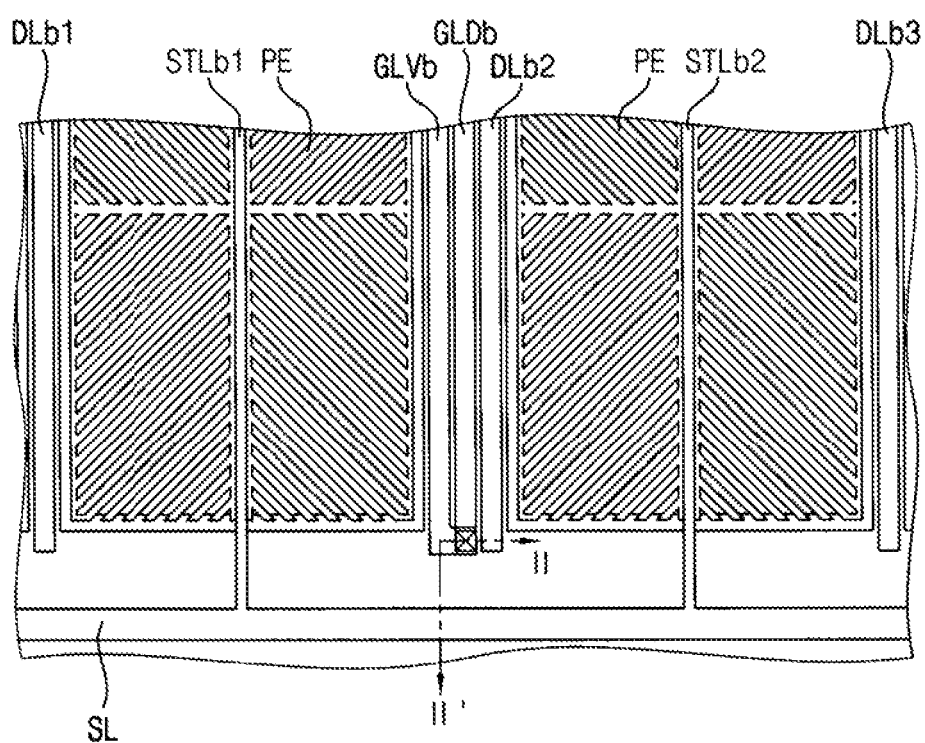
FIG. 7 is an enlarged plan view illustrating C area of FIG. 1.
Figure 8:
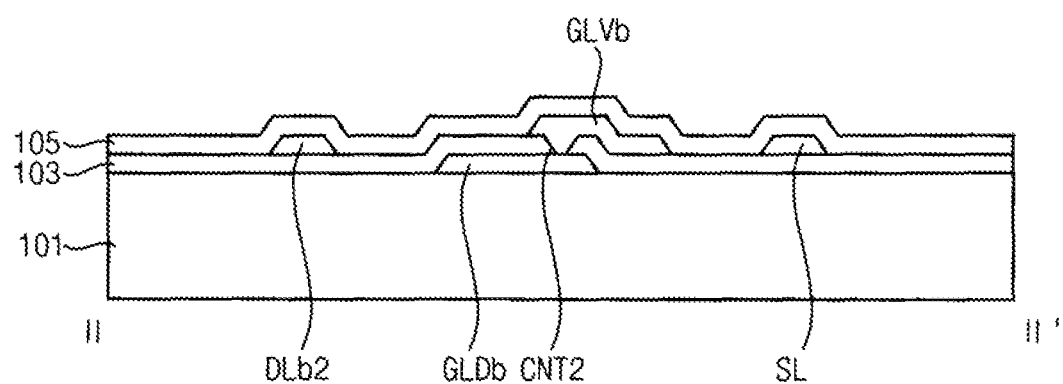
FIG. 8 is a cross-sectional view taken along a line II-II' of FIG. 7.

Turning now to FIGS. 7 and 8, FIG. 7 is an enlarged plan view illustrating area C of FIG. 1 and FIG. 8 is a cross-sectional view taken along a line II-II' of FIG. 7. Referring now to FIGS. 7 and 8, a display panel 100 of a display apparatus according to the present example embodiment may include a base substrate 101, a diagonal gate line GLDb, a gate insulation layer 103, data lines DLb1, DLb2 and DLb3, a vertical data line GLVb, storage lines STLb1 and STLb2, storage voltage supply line SL, a data insulation layer 105, and a pixel electrode PE. Because area C of FIG. 1 is arranged within second display area VDA, a structure having the vertical data line GLVb electrically connected to the diagonal gate line GLDb is illustrated and described in FIGS. 7 and 8.

The base substrate 101 may include a transparent insulating material that may constitute a flexible substrate. The diagonal gate line GLDb is arranged on the base substrate 101. The diagonal gate line GLDb may zigzag diagonally across the display by alternately extending in a first direction D1 and in a second direction D2 that is substantially perpendicular to the first direction D1.

The gate insulation layer 103 may be disposed on the base substrate 101 and on the diagonal gate line GLDb. The gate insulation layer 103 may include an inorganic insulation layer and/or organic insulation layer.

The data lines DLb1, DLb2 and DLb3 may be disposed on the gate insulation layer 103. The data lines DLb1, DLb2 and DLb3 may extend in the first direction D1 and may be spaced apart from each other in the second direction D2.

The vertical gate line GLVb may be disposed on the gate insulation layer 103. For example, the vertical gate line GLVb may be formed from a same layer as the data lines DLb1, DLb2 and DLb3, and may extended in the first direction D1. Since area C of FIG. 1 corresponds to the second display area VDA, the vertical gate line GLVb may be electrically connected to the diagonal gate line GLDb. For example, the vertical gate line GLVb may make contact the diagonal gate line GLDb through a fourth contact hole CNT4 that perforates the gate insulation layer 103.

The storage lines STLb1 and STLb2 and the storage voltage supply line SL may be arranged on the gate insulation layer 103. For example, the storage lines STLb1 and STLb2 and the storage voltage supply line SL may be made from a same layer as that of the data lines DLb1, DLb2 and DLb3.

The data insulation layer 105 may be arranged on the base substrate 101, on the data lines DLb1, DLb2 and DLb3, on the vertical gate line GLVb, on the storage lines STLb1 and STLb2 and on the storage voltage supply line SL.

Figure 9:
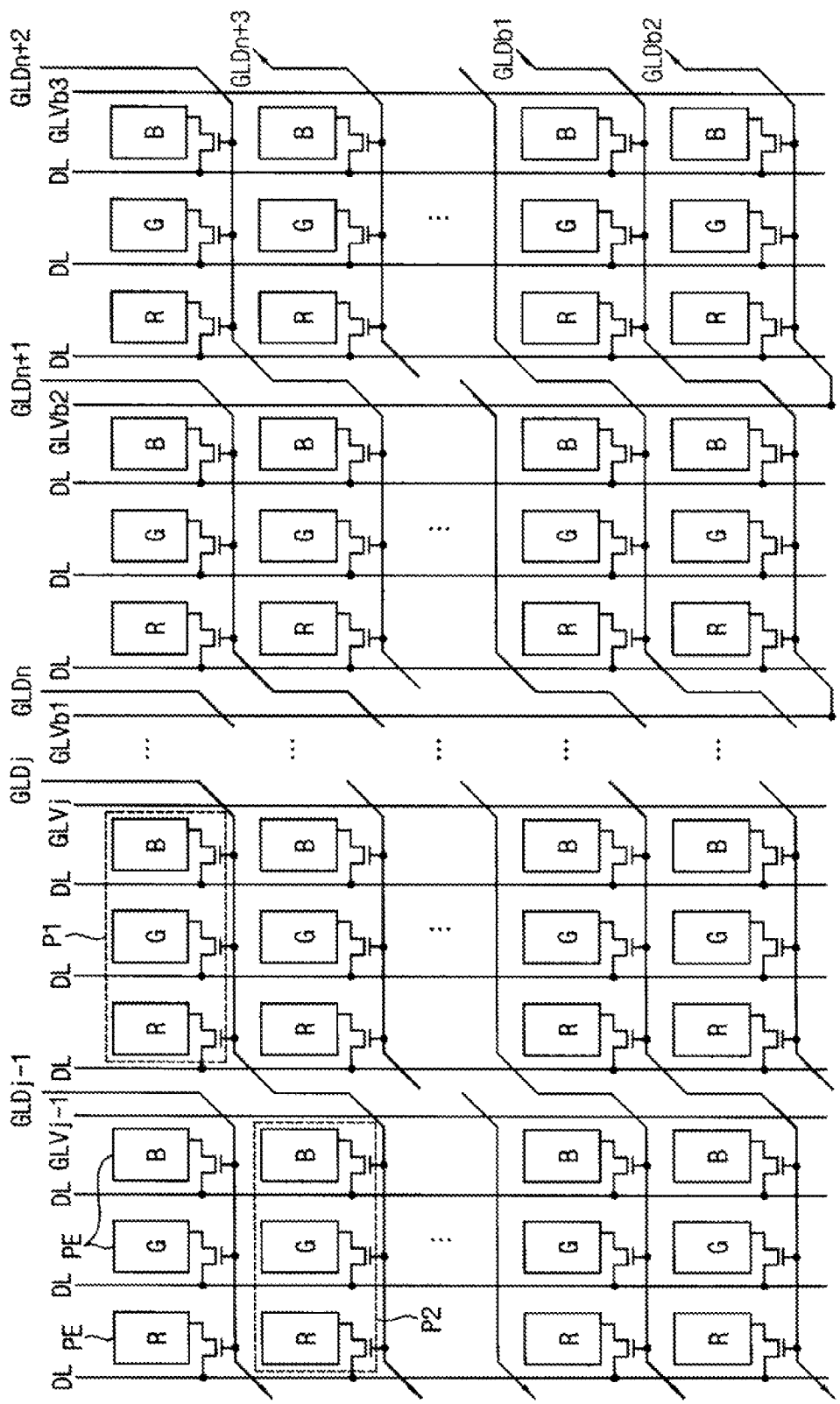
FIG. 9 is a plan view partially illustrating sub pixels of a display apparatus according to an exemplary embodiment of the present invention.

Turning now to FIG. 9, FIG. 9 is a plan view partially illustrating sub pixels of a display apparatus according to an exemplary embodiment of the present invention. Referring now to FIG. 9, a display panel 100 of a display apparatus according to the present example embodiment may include a plurality of pixels P1 and P2, a plurality of diagonal gate lines GLDj−1, GLDj, GLDn, GLDn+1, GLDn+2, GLDn+3, GLDb1 and GLDb2, a plurality of data lines DL, a plurality of pixel electrodes PE, and a plurality of vertical gate lines GLVj−1, GLVj, GLVb1, GLVb2 and GLVb3.

Each of the pixels P1 and P2 may include a plurality of pixel electrodes PE. For example, each of the pixels P1 and P2 includes three pixel electrodes PE. The pixel electrodes PE of the pixels P1 and P2 may include sub-pixels that transmit a predetermined color. For example, the pixels P1 and P2 include a red sub-pixel R, a green sub-pixel G and a blue sub-pixel B. The sub-pixels may be arranged in a matrix form.

In a first display area DDA of the display apparatus, the pixels that are arranged in a diagonal direction may receive a gate signal having a same timing. For example, a first pixel P1 and a second pixel P2 that is disposed adjacent to the first pixel P1 in the diagonal direction DX may receive a first gate signal synchronized from j-th diagonal gate line GLDj at a same time.

Each of the data lines DL may be electrically connected to the pixel lines PE. The data lines DL and the vertical gate lines GLVj−1, GLVj, GLVb1, GLVb2 and GLVb3 may extend parallel to each other. In the first display area DDA of the display apparatus, the vertical gate lines GLVj−1 and GLVj may be dummy gate lines that are not used for driving the first pixel P1 and the second pixel P2 upon the second display area VDA receiving second gate signals.

In the second display area VDA of the display apparatus, the vertical gate lines GLVb1 and GLVb2 may be electrically connected to the diagonal gate lines GLDb1 and GLDb2 respectively. Accordingly, a second gate signal may be applied to the diagonal gate lines GLDb1 and GLDb2 via the vertical gate lines GLVb1 and GLVb2 respectively. Therefore, in the second display area VDA of the display apparatus, a direction that the second gate signals are applied to the pixels may be opposite to a direction in that the first gate signals are applied to the pixels in the first display area DDA.

Figure 10:
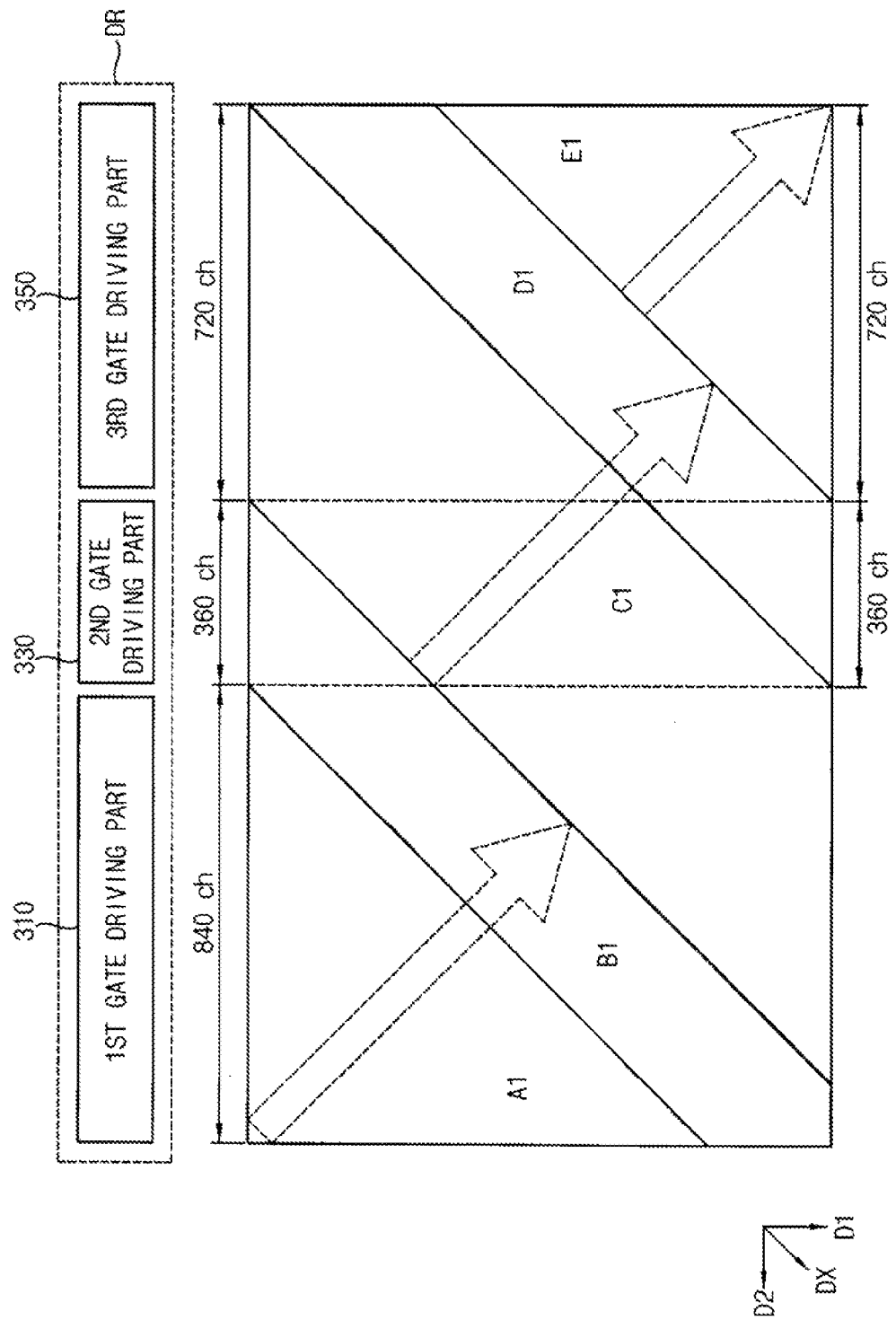
FIG. 10 is a plan view illustrating driving timing of a display apparatus according to an exemplary embodiment of the present invention.

Turning now to FIG. 10, FIG. 10 is a plan view illustrating driving timing of a display apparatus according to an exemplary embodiment of the present invention. Referring to FIG. 10, a display apparatus according to the present example embodiment may include a driving part DR. The driving part DR may include a plurality of gate driving parts 310, 330 and 350. For example, the driving part DR includes a first gate driving part 310, a second gate driving part 330 and a third gate driving part 350, where the first gate driving part 310 may have 840 channels, the second gate driving part 330 may have 360 channels, and the third gate driving part 350 may have 720 channels, each channel corresponding to a diagonal gate line. It is noted that gate driving parts 310, 330 and 350 of FIG. 10 do not necessarily correspond to driving parts DR1, DR2 and DR3 of FIG. 1.

In the present example embodiment, drive timing of the driving part DR will be described hereinafter. Areas A1, B1 and C1 of FIG. 10 correspond to the first display area DDA of FIG. 1 and indicate an area of the display that first gate signals are applied to the pixels and where the first plurality of vertical gate lines GLVa are connected to the floating voltage supply line. Similarly, areas D1 and E1 of FIG. 10 correspond to the second display area VDA of FIG. 1 and correspond to a portion of the display panel where second gate signals are applied to the pixels and where the diagonal gate lines are connected to the vertical gate lines GLVb.

The driving sequence begins with first gate driving signals being sequentially applied to 840 diagonal gate lines that are connected to the first gate driving part 310, so that pixels in area A1 of a display panel may be driven. Then, first gate driving signals may be sequentially applied to 360 diagonal gate lines that are connected to the second gate driving part 330 so that pixels in area B1 of the display panel may be driven. Then, first gate driving signals may be sequentially applied to 720 diagonal gate lines that are connected to the third gate driving part 350 so that pixels in area C1 of the display panel may be driven.

Then, second gate driving signals may be sequentially applied to 360 vertical gate lines that are connected to the second gate driving part 330 so that the second gate driving signals may be sequentially applied to diagonal gate lines arranged within area D1 of the display panel via the vertical gate lines. Accordingly, pixels in area D1 of the display panel may be driven while a floating voltage may be supplied to 840 vertical gate lines that are connected to the first gate driving part 310.

Subsequent to driving area D1, second gate driving signals may then be sequentially applied to 720 vertical gate lines that are connected to the third gate driving part 350, so that the second gate driving signals may be sequentially applied to diagonal gate lines arranged within area E1 of the display panel via the vertical gate lines. Accordingly, pixels in area E1 of the display panel may be driven while the floating voltage may be applied to 840 vertical gate lines that are connected to the first gate driving part 310 to reduce image flicker.

According to the exemplary embodiments of the present invention, a driving part DR of a display apparatus is arranged adjacent to a first side of a display panel, so that a peripheral area of the display panel may be reduced. In addition, after display timing of the first display area DDA where first gate signals are synchronized with pixels along the diagonal direction DX, during display timing of the second display area VDA where second gate signals are synchronized with pixels along an opposite direction of the diagonal direction (i.e., −DX), a floating voltage is applied to dummy gate lines (i.e. vertical gate lines) arranged within the first display area DDA, so that flicker, which occurs when the dummy gate lines of the first display area are effected by peripheral electrical signals, may be reduced. Thus, display quality may be improved.

In summary, the inventor is addressing the problem of large screen for displaying images that includes many flat display apparatus arranged adjacent to each other. The inventor has recognized that such an arrangement can be detrimental if the peripheral area of the flat display apparatuses is too large. The inventor addresses this problem by providing a display apparatus having all of the driving parts that include both the gate and data drivers arranged on one side only of the display panel, thereby leaving a remaining 3 sides of the display panel free and absent of any drivers. The display panel includes a plurality of first or (or diagonal) gate lines zigzagging across the display panel in a diagonal direction DX between a first direction D1 and a second direction D2 by alternately extending in the first direction D1 and the second direction D2, and a plurality of second (or vertical) gate lines extending in the first direction D1, the diagonal gate lines, the data lines and the vertical gate lines being electrically connected to the driving parts DR on the one side of the display panel. Your client divides the display panel into a first display area and a second display area, the first display area DDA including pixels that receive first gate signals from the diagonal gate lines, where said diagonal gate lines receive said first gate signals directly from the driving parts. In the second display area VDA, the diagonal gate lines may be electrically connected to the vertical gate lines to also allow pixels arranged within the second display area VDA to receive second gate signals from the diagonal gate lines, where the diagonal gate lines receive said second gate signals from the driving part via vertical gate lines GLVb. While second gate signals are being delivered to the pixels within the second display area VDA, the vertical gate lines GLVa arranged entirely within the first display area DDA may receive floating voltage signals via a floating voltage supply line electrically connected to the vertical gate electrodes GLVa. By doing so, image flickering can be reduced. By designing the display apparatus and display panel as such, a size of a peripheral boundary of the flat display apparatuses can be reduced, and therefore a plurality of flat display apparatuses can be used to display a single image without a large periphery interfering.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display apparatus including a display panel and a driving part to drive the display panel, the display panel comprising:
    a plurality of pixels arranged in a matrix form along a first direction and a second direction crossing the first direction;
    a plurality of first gate lines extending across the display in a diagonal direction that is between the first and the second directions by alternately extending in each of the first and the second directions;
    a first insulation layer arranged on the first gate lines;
    a plurality of second gate lines arranged on the first insulation layer and extending in the first direction;
    a plurality of data lines extending parallel to the second gate lines, the driving part being electrically connected to the first and the second gate lines and the data lines; and
    a floating voltage supply line electrically connected to at least one of the second gate lines.

2. The display apparatus of claim 1, wherein the display panel further comprises:
    a first display area including a plurality of first pixels electrically connected to a first plurality of the first gate lines, wherein the first plurality of the first gate lines to apply a first gate signal to the first pixels by receiving the first gate signal directly from the driving part; and
    a second display area including a plurality of second pixels electrically connected to a second plurality of the first gate lines, wherein the second gate lines include a first plurality of second gate lines that are arranged entirely within the first display area and a second plurality of second gate lines, each having at least a portion arranged within the second display area, the second plurality of the first gate lines to apply a second gate signal to the second pixels by receiving the second gate signal from the driving part via the second plurality of second gate lines.

3. The display apparatus of claim 2, wherein within the first display area, a first end of each of the first plurality of second gate lines is connected to the driving part, and a second and opposite end of each of the first plurality of second gate lines is connected to the floating voltage supply line.

4. The display apparatus of claim 2, wherein a timing of applying the second gate signal is subsequent to a timing of applying the first gate signal.

5. The display apparatus of claim 2, wherein the floating voltage supply line applies a floating voltage to the first plurality of the second gate lines arranged entirely within the first display area while the second pixels are being driven.

6. The display apparatus of claim 2, wherein within the second display area, the second plurality of the first gate lines are respectively electrically connected to the second plurality of second gate lines.

7. The display apparatus of claim 6, wherein an end portion of each first gate line within the second display area and opposite to the driving part is electrically connected to a corresponding one of the second plurality of second gate lines.

8. The display apparatus of claim 1, wherein the driving part is adjacent to a first side of the display panel.

9. The display apparatus of claim 8, wherein the floating voltage supply line is adjacent to a second and opposite side of the display panel.

10. The display apparatus of claim 1, wherein the second gate lines and the data lines are comprised of substantially a same material.

11. The display apparatus of claim 1, wherein the second gate lines and the data lines are formed from a same layer.

12. The display apparatus of claim 11, the display panel further comprising a second insulation layer arranged on the second gate lines and on the data lines, wherein the floating voltage supply line makes contact with the at least one of the second gate lines through a contact hole perforating the second insulation layer.

13. The display apparatus of claim 1, wherein the floating voltage supply line is formed from a same layer as the first gate lines.

14. The display apparatus of claim 13, wherein the floating voltage supply line comprises:
    an extending portion extending in the second direction; and
    a connecting portion protruding from the extending portion.

15. The display apparatus of claim 14, wherein at least one end of the second gate lines makes contact with the connecting portion via a contact hole perforating the first insulation layer.

16. The display apparatus of claim 1, wherein the floating voltage supply line is formed from a different layer than that of the first gate lines.

17. The display apparatus of claim 1, wherein each of the pixels comprise a plurality of pixel electrodes and a plurality of switching elements that are electrically connected to the pixel electrodes, and wherein the switching elements overlap a portion of the first gate lines at a location corresponding to where the first gate lines extend in the second direction.

18. A display apparatus including a display panel and a driving part to drive the display panel, the display panel having a first side extending in a first direction, a second side opposite the first side, and third and fourth sides extending in a second direction and connecting the first side to the second side, the driving part being arranged adjacent to the first side, the display panel comprising:
    a diagonal gate line zigzagging in a diagonal direction by alternately extending in the first and the second directions;
    a dummy gate line extending in the second direction;
    a data line extending parallel to the dummy gate line; and a floating voltage supply line electrically connected to the dummy gate line, wherein the floating voltage supply line applies a floating voltage to the dummy gate line when a gate signal is not being applied to the diagonal gate line.

19. The display apparatus of claim 18, wherein the floating voltage supply line is adjacent to the second side.

20. The display apparatus of claim 1, wherein a plurality of gate signals are applied to the pixels via the first gate lines, the gate signals being synchronized along the diagonal direction.

\* \* \* \* \*